United States Patent
Kumar et al.

(10) Patent No.: US 7,557,528 B2
(45) Date of Patent: Jul. 7, 2009

(54) SYSTEM, METHOD, AND COMPUTER SOFTWARE CODE FOR DETECTION AND INTERCHANGEABILITY OF A MOTOR

(75) Inventors: Ajith K. Kumar, Erie, PA (US); Kevin Jones, Erie, PA (US)

(73) Assignee: General Electric Company, Schenectady, NY (US)

( * ) Notice: Subject to any disclaimer, the term of this patent is extended or adjusted under 35 U.S.C. 154(b) by 68 days.

(21) Appl. No.: 11/534,772

(22) Filed: Sep. 25, 2006

(65) Prior Publication Data
US 2008/0074070 A1 Mar. 27, 2008

(51) Int. Cl.
G05B 23/02 (2006.01)

(52) U.S. Cl. .................. 318/565; 318/567; 702/182; 702/183

(58) Field of Classification Search .......... 318/561, 318/567, 565, 700, 400.01; 702/181, 182, 702/183, 184, 188
See application file for complete search history.

(56) References Cited

U.S. PATENT DOCUMENTS

| | | | |
|---|---|---|---|
| 5,456,604 A * | 10/1995 | Olmsted et al. ............ 434/62 |
| 5,585,717 A | 12/1996 | Eriksson et al. | |
| 5,629,870 A * | 5/1997 | Farag et al. ............... 700/286 |
| 6,262,550 B1 * | 7/2001 | Kliman et al. ............. 318/565 |
| 6,297,742 B1 * | 10/2001 | Canada et al. ............. 340/635 |
| 6,393,373 B1 * | 5/2002 | Duyar et al. .............. 702/115 |
| 6,903,525 B2 | 6/2005 | Carson et al. | |
| 6,920,413 B2 * | 7/2005 | Sumida et al. ............ 702/189 |
| 7,127,373 B2 * | 10/2006 | House et al. ............. 702/182 |
| 7,135,830 B2 * | 11/2006 | El-Ibiary ................. 318/561 |
| 7,171,372 B2 * | 1/2007 | Daniel et al. ............... 705/7 |
| 7,184,902 B2 * | 2/2007 | El-Ibiary ................. 702/60 |
| 7,406,399 B2 * | 7/2008 | Furem et al. ............. 702/182 |
| 2002/0022984 A1 * | 2/2002 | Daniel et al. ............... 705/8 |

* cited by examiner

Primary Examiner—Bentsu Ro
Assistant Examiner—Anthony M Paul
(74) Attorney, Agent, or Firm—Robert Wawrzyn, Esq.; Terry M. Sanks, Esq.; Beusse Wolter Sanks Mora & Maire, P.A.

(57) ABSTRACT

A method for autonomously identifying a type of motor based on a characteristic value of the motor, the method including measuring a characteristic value of a motor, comparing the measured characteristic value to a known characteristic value, and identifying the motor based on the measured characteristic value when compared to the known characteristic value.

32 Claims, 3 Drawing Sheets

SYSTEM, METHOD, AND COMPUTER SOFTWARE CODE FOR DETECTION AND INTERCHANGEABILITY OF A MOTOR

FIELD OF INVENTION

Exemplary embodiments of the invention relate to a locomotive and, more particularly, to a system, method, and computer software code for autonomously identifying a type of motor being used.

BACKGROUND OF THE INVENTION

Locomotives, electrical multi-unit trains, such as subways and light rail vehicle trains, and some off-road utility vehicle utilize a variety of motors to operate. For example, one type of motor used is traction motors. Typically these vehicles employ a large diesel engine to drive an alternator, or they are powered by externally supplied electricity. The electric power from the alternator or the external supply is conducted to traction motors located beneath a platform of the locomotive. The traction motors convert the electrical power to rotational mechanical power. The traction motors are engaged to provide tractive effort and braking effort, or in other words to drive wheels through axles. The rotation of the wheels by the traction motors drives the locomotive along its rails. Specifically these motors are used to power the driving wheels of these vehicles by providing propulsion power to the wheels. There is usually at least one traction motor on each axle. Generally, each motor drives a small gear, which meshes with a larger gear on the axle shaft. This provides the gear reduction that allows the motor to drive the train.

Locomotives use traction motors to provide tractive effort and braking effort. These motors need to be controlled and protected, such as from overheating, for proper operation. As technology improves, improved traction motors are being developed. Thus during maintenance, older traction motors may be replaced with newer traction motors. The newer motors may require different operating conditions to function optimally. The same is true of other motors that may be used on such vehicles as locomotives. Furthermore, advantages may be realized if different types of motors may be installed on a locomotive in view of such issues as operational conditions, logistics, manufacturing, and/or costs.

Towards this end, it may be advantageous to train owners and locomotive operators for the locomotive to identify the motor by itself, or to electronically determine a type of motor, and not depend on manual confirmation when determining configuration information. Having the locomotive autonomously identify the type(s) of installed motors is particularly advantageous due to potential motor change out during maintenance activities, which can result in different motor type combinations from that which previously existed.

BRIEF DESCRIPTION OF THE INVENTION

Exemplary embodiments of invention are directed towards a system, method and computerized method for autonomously identifying a type of motor, such as but not limited to a traction motor, being used. Towards this end a method for autonomously identifying a type of motor based on a characteristic value of the motor is disclosed. The method includes measuring a characteristic value of a motor. The measured characteristic value is compared to a known characteristic value. The motor is identified based on the measured characteristic value when compared to the known characteristic value.

In another exemplary embodiment a system for autonomously identifying a type of motor based on a characteristic value of the motor. The system includes a measuring device to measure a characteristic value of the motor. A processor that receives data specific to the measured characteristic value is also provided. Also included is a storage device in communication with the processor. Wherein the processor compares the measured characteristic value to a known characteristic data so as to determine the type of motor.

A computer software code operable within a processor for autonomously identifying a type of motor based on a characteristic value of the motor is further disclosed. A measuring device is configured to measure the characteristic value of the motor. When executed by the processor, the computer software code causes the processor to compare the measured characteristic value to a known characteristic value. Additionally, when executed by the processor, the computer software code causes the processor to identify the motor based on the measured characteristic value when compared to the known characteristic value.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
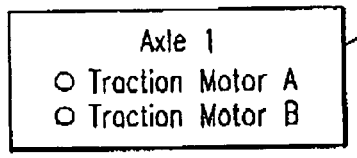
FIG. 1 depicts an exemplary embodiment of a computer screen wherein an operator inputs configuration information.

Reference will now be made in detail to the embodiments consistent with the invention, examples of which are illustrated in the accompanying drawings. Wherever possible, the same reference numerals used throughout the drawings refer to the same or like parts.

Exemplary embodiments of the invention solve problems in the art by providing a system, method, and computer implemented method for autonomously identifying a type of traction motor being used. Persons skilled in the art will recognize that an apparatus, such as a data processing system, including a CPU, memory, I/O, program storage, a connecting bus, and other appropriate components, could be programmed or otherwise designed to facilitate the practice of an exemplary embodiment of the method/system disclosed herein. Such an exemplary method/system may include appropriate program means for executing the method.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, the technical effect is autonomously identifying a type of motor, such as but not limited to a traction motor, being used. To facilitate an understanding, it is described hereinafter with reference to specific implementations thereof. Exemplary embodiments of the invention may be described in the general context of computer-executable instructions, such as program modules, being executed by a computer. Generally, program modules include routines, programs, objects, components, data structures, etc. that performs particular tasks or implement particular abstract data types. For example, the software programs that underlie the invention can be coded in different languages, for use with different platforms. As technology advances exemplary examples of the invention may be implemented in the context of a web portal that employs a web browser. It will be appreciated, however, that the principles that underlie the invention can be implemented with other types of computer software technologies as well.

Moreover, those skilled in the art will appreciate that exemplary embodiments of the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Referring now to the drawings, exemplary embodiments of the invention will be described. The invention can be implemented in numerous ways, including as a system (including a computer processing system), a method (including a computer implemented method), an apparatus, a computer readable medium, a computer program product, a graphical user interface, including a web portal, or a data structure tangibly fixed in a computer readable memory. Furthermore, though many of the exemplary embodiments are presented with respect to traction motors, those skilled in the art will readily recognize that the exemplary embodiments of the invention may be used for motors other than just traction motors, such as but not limited to radiator motors, cooling blower motors, exhaust motors, alternators, pump motors, etc. Several exemplary embodiments of the invention are discussed below.

FIG. 1 depicts an exemplary embodiment of a computer screen wherein an operator inputs configuration information. In this exemplary embodiment, a user, operator, may manually identify the traction motor configuration, such as each traction motor by motor type. As illustrated, the user is able to select either traction motor A or traction motor B for the first axle of the locomotive. Though a computer screen 20 is illustrated, in other exemplary embodiments, notification of the type of motor being used may be accomplished any number of ways, such as but not limited to, configuration option information entry, selector switch, and/or verbal communication. Though techniques involving manual intervention are possible, as further disclosed herein locomotive owners may also prefer automated systems and/or methods as well.

Figure 2:
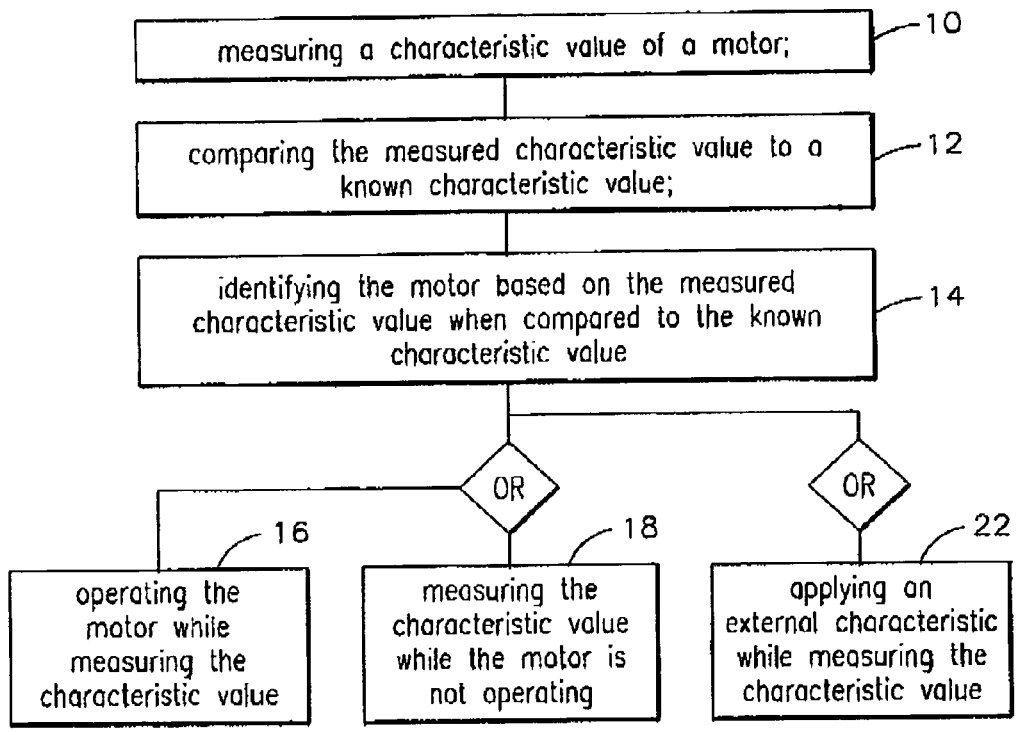
FIG. 2 depicts an exemplary embodiment of a flow chart for determining a type of motor based on unique characteristics of the motor.

FIG. 2 depicts an exemplary embodiment of a flow chart for determining a type of motor based on unique characteristics of the motor. As illustrated, a characteristic value is measured specific to a motor, such as a traction motor, step 10. The measured characteristic value is compared to a known characteristic value, step 12. The motor is identified based on the measured characteristic value when compared to the known characteristic value, step 14. This determination may be made either while the motor is producing torque, step 16, or when the traction motor is not producing torque, step 18. This determination as to the state of the motor is based on the characteristic value being measured. Also, depending on the characteristic value being measured, an external characteristic, such as but not limited to a current value and/or voltage value, may be applied to the motor while the measured characteristic value is being measured, step 22. As further disclosed herein, the characteristic value may be at least one of a number of poles on a traction motor, rotor saliency, speed sensor teeth, motor phase sequence, speed sensor phase sequence, number of windings, a resistance value, an inductance value, a magnetization value, frequency, a torque value, voltage and/or current.

In an exemplary embodiment, a determination as to a type of traction motor is made based on the number of poles. When a train operates at a given speed, tractions motors emit a certain frequency based on the type of motor installed. While the traction motor is being operated at a given motor speed, the current and/or torque across a traction motor is determined, or measured. These results are compared against data contained in a look-up table having motor specifications, or known characteristic values based on motor speed. For example, suppose traction motor A has 6 poles whereas traction motor B has 8 poles. When a train is operated at a given speed, a motor's required excitation frequency is essentially dictated by the number of poles. Two motors running at the same mechanical speed, but having different number of poles, will operate at substantially different electrical frequencies. Therefore if traction motor A and traction motor B are on the same locomotive running at the same speed, different excitation frequencies, or frequencies, will be produced by the two motors. This difference of frequency can then be used to determine motor type. Specifically, if the type of motor is unknown, once this frequency characteristic is measured, it may be compared to known values to determine the type of traction motor operating.

The difference in a number of poles per traction motor also holds true with respects to torque produced by motors having a different number of poles. Towards this end, traction motor A will produce a different torque value than traction motor B when both motors are on a locomotive operated at a specific synchronous speed. The difference in torque can then be used to determine motor type. Specifically, if the type of motor is unknown, once torque values are measured, these values may be compared to known values to determine the type of traction motor operating.

Figure 3:
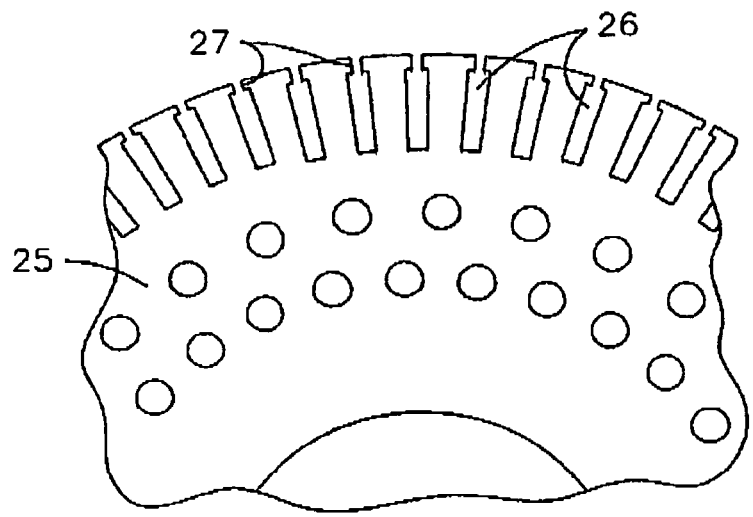
FIG. 3 depicts an exemplary embodiment traction motor so as to illustrate its saliency.

FIG. 3 depicts an exemplary embodiment traction motor so as to illustrate its saliency. Each type of traction motor usually has a unique rotor 25 saliency characteristic when the rotor 25 is spinning. Rotor saliency is caused by the variation of the reluctance around the rotor. The rotor saliency can be introduced in motors by various methods which may control slot 26 leakage. This could be done changing at least one of slot 26 width, slot 26 depth, slot opening 27 width, slot opening 27 depth, etc. When voltage is applied to the stator of a turning motor, the ripple current and/or voltage could be used to determine the motor saliency. This measured signature can be compared to a known slot ripple characteristic, for example contained in a look-up table, to determine the type of traction motor being used. In another exemplary embodiment, when the locomotive is stationary, a signal, such as a high frequency pulse width modulation (PWM) signal, may be injected across the stator of the traction motor to determine the saliency and hence the type of traction motor. This measured data is then compared to data contained in a look up table to determine the type of traction motor being used.

Figure 4:
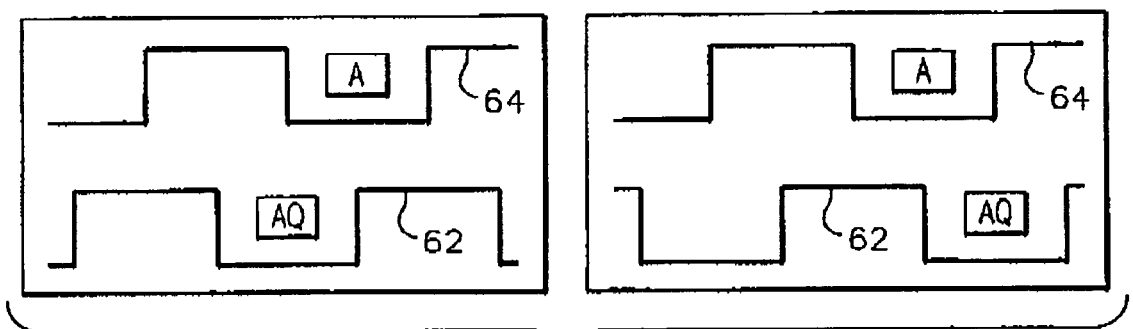
FIG. 4 depicts exemplary embodiments of quadrature and phase signals.

FIG. 4 depicts exemplary embodiments of quadrature and phase signals. The type of motor may be determined based on the traction motor speed sensor (TMSS) teeth 60. Traction motor speed sensors may be designed such that different traction motors have different signatures. The speed sensor is part of the traction motor. Depending on the type of traction motor, the type of speed sensor varies, specific with respects to the number of teeth on the speed sensor 60. Typically quadrature speed sensors are used. One signal 62 leads the other signal 64 by 90 degrees. For example in one system a quadrature signal 62 leads a phase signal A 62 by 90 degrees and in the other the quadrature signal 62 may lag the other signal 64 by 90 degrees. In another example the delay or lead angle could be adjusted to determine the type of the traction motor. This is achieved by the spacing between the two sensors relative to the width of the speed sensing tooth gear. When the traction motor is operating, the frequency of the motor can be measured. This measured data is then compared to data contained in a look up table to determine a type of traction motor being used.

Figure 5:
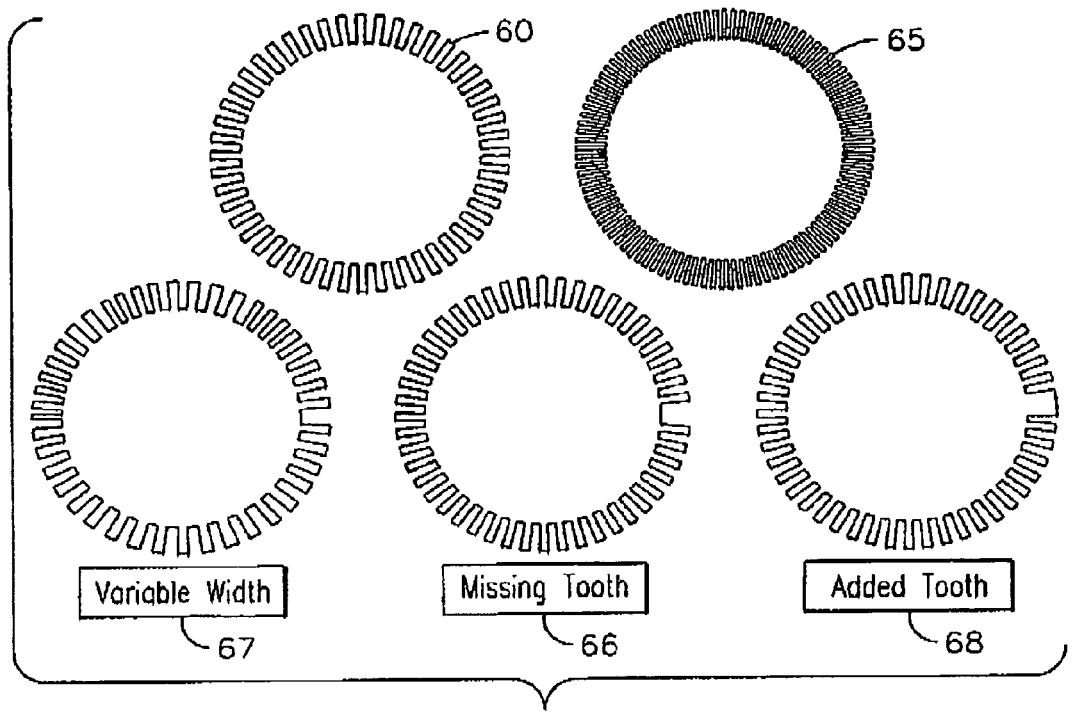
FIG. 5 depicts other exemplary embodiments of traction motor speed sensor teeth configurations.

FIG. 5 depicts other exemplary embodiments of traction motor speed sensor teeth configurations. The different tooth patterns can be based on teeth geometry (such as wider and/or narrower teeth) 65, missing teeth 66, variable width teeth 67, and/or added teeth 68 when compared to a typical teeth pattern 60. As discussed above these differences in the teeth arrangement can be utilized to detect the type of traction motor being used during operation of the traction motor or while the locomotive is stationary. Traction motors with differing properties, such as but not limited to electrical properties and mechanical properties, but having the same number of poles, may be equipped with differing number of speed sensor teeth. When the motor is excited at a known electrical frequency, the resulting teeth pattern may be measured and compared to known teeth patterns to determine the motor type. Thus, the motor type can be determined when the motor is rotating by comparing the speed sensor frequency signature against known signatures with respect to the teeth configurations.

Figure 6:
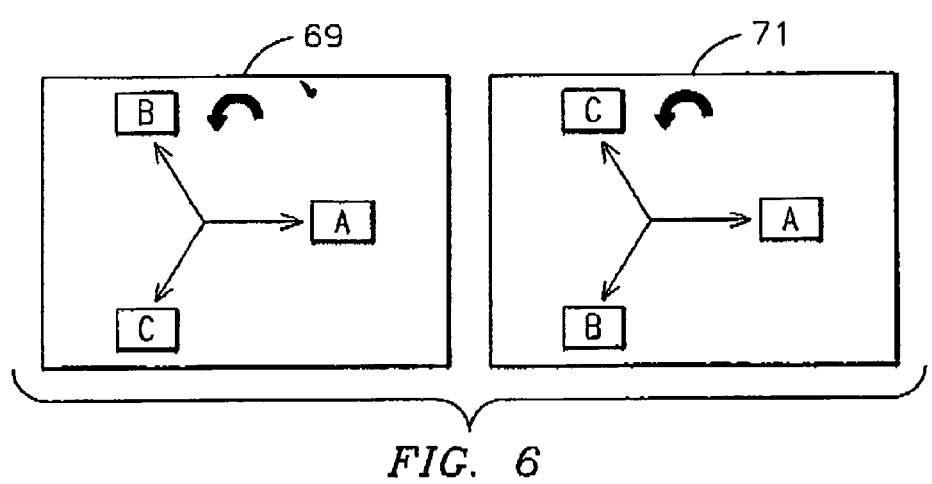
FIG. 6 depicts exemplary embodiments of a direction a motor turns.

FIG. 6 depicts exemplary embodiments of a direction a motor turns. The type of motor is determined based on measuring a phase sequence within the traction motor. It is possible that the motors may have different windings whereas one type of motor may turn in a given direction 69 and another motor may turn in another direction 71. When this is so, it is possible to sense the direction a motor is turning. When the motor is nearly stationary, this can be accomplished by applying a low frequency across the motor and determine the phase sequence. Depending on the direction it turns, it is possible to determine the type of motor installed. When the motor is moving and the low frequency is applied, the torque can be used as the determinant, Traction motors with differing electrical properties can be designed such that for a known excitation phase sequence, the direction of physical rotation will be opposite. This direction of rotation when compared to expected rotation directions might then be used to determine motor type. A sensor can be used to sense current and/or torque values that identify the phase signal characteristic.

This measured data is then compared to data contained in a look up table to determine a type of traction motor being used.

When the motor is stationary, in another exemplary embodiment, the type of motor may be determined based on measuring a resistance/inductance at zero speed. In one exemplary embodiment, a DC current is applied to the stator. The stator winding resistance is measured. This measured data is then compared to data contained in a look up table to determine a type of traction motor being used. That data can be compensated for based on temperature of the resistance of the stator winding. Though reference is made herein to the use of look up tables, those skilled in the art will readily recognize that a look up table may relate to formulas and/or equations wherein data is applied in the formula and/or equation and the traction motor is determined based on the result produced by the equation. In other exemplary embodiments saturated and/or unsaturated leakage inductance is measured, change in current is measured, and a change in voltage is measured. While at zero speed, traction motor type can be determined by applying a known voltage for a short duration and measuring the motor's phase current response. The resulting di/dt, based on the change in phase current along with the known voltage and time, can then be compared to expected values to determine the motor type. Similarly, single-phase voltage and/or high frequency three-phase voltage may be applied. A determination of the type of motor may be made based on the resistance value of the motor.

Figure 7:
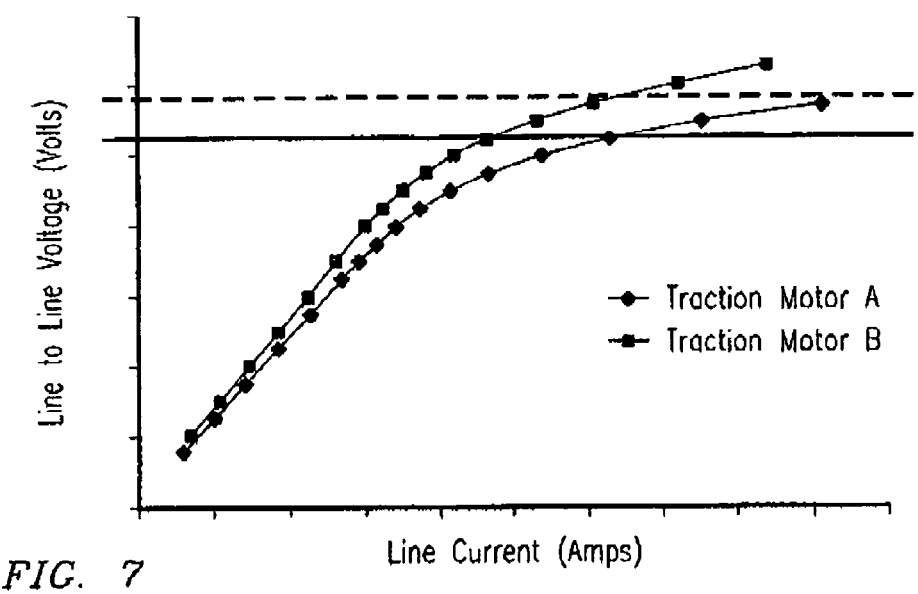
FIG. 7 depicts a representative graph of current and voltage values for two exemplary traction motors.

In yet another exemplary embodiment a determination of the type of motor may be made based on measuring magnetization characteristics of the motor while the train is in motion. By doing so, voltage applied to the motor can be changed and the current is measured. The resulting current can be used to determine the motor, using a look up table. FIG. 7 depicts a representative graph of current and voltage values for two exemplary traction motors. As illustrated, as voltage varies, the current is different for each type of traction motor. Specifically, while the locomotive is moving, via excitation of the traction motor, when at a no-load and/or light load conditions, the following steps may be used to determine traction motor type. Torque production is limited to a small and/or zero value. Voltage is then applied to the motor in a controlled manner to a known level based on present locomotive speed. The motor's exciting current is then measured and compared to expected levels, such as but not limited to levels based on applied voltage, and speed, to determine what type of traction motor is connected. If the determined motor type is different that that presently assumed, application parameters are revised for optimum motor control.

A Motor type may also be determined during normal locomotive operation, namely while producing torque, by comparing motor current to the expected values of current. The expected value of current can be determined based on the motor characteristic, the applied voltage, applied frequency, motor speed, motor slip, motor temperature and torque being produced. Instead of comparing expected current and actual current other parameters, as disclosed above may be used.

Figure 8:
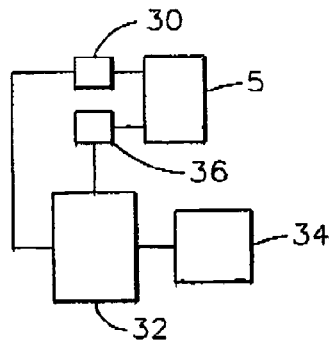
FIG. 8 depicts exemplary elements that may comprise the present invention.

As discussed above, the above-described embodiments may be accomplished autonomously. FIG. 8 depicts exemplary elements that may comprise the present invention. A measuring device 30 is provided to measure a characteristic value of the traction motor 5. As discussed above, the characteristic value may be, but is not limited to, number of poles of the traction motor, rotor saliency, speed sensor teeth, phase sequence, windings, resistance value, inductance value, magnetization, frequency, torque, voltage, and current. A processor 32 is used to compare the measured characteristic value to a known characteristic value contained in a look-up table. A storage device 34 is used to retain the known characteristic values and the storage device 34 is in communication with the processor 32. The form of communication may be a direct link and/or wireless. Depending on the characteristic value to be measured, as discussed above, an introducing device 36 may be used to introduce an element, or external characteristic value, such as but not limited to a light, current, voltage, so that the measuring device can then measure the characteristic value generated by the introduced element. In an exemplary embodiment the processor 32 controls the introducing device 36. However those skilled in the art will readily recognize that an external force, such as signal from a remote facility, may also control it. Though an exemplary embodiment may have the processor and storage device both located on a train, those skilled in the art will readily recognize that these elements may be located in distant locations wherein they may not be located at the same location. For example, the processor may be located on the train whereas the data collected through the functions of the processor are then transmitted to a remote facility where the measured characteristics are then compared to the look-up table. Likewise, the processor may be part of a handheld device that may be connected to a train while the train is at a depot.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A method for autonomously identifying a type of an unknown motor, said unknown motor being configured to function optimally at a respective one of a plurality of known characteristic values, the method comprising:
   a. measuring a characteristic value of the unknown motor;
   b. comparing the measured characteristic value to the plurality of known characteristic values, each known characteristic value being associated with a respective type of the unknown motor, to ascertain the identity of the type of the unknown motor; and
   c. identifying the type of the unknown motor based on the comparing of the measured characteristic value to the plurality of known characteristic values.

2. The method of claim 1 wherein a characteristic value comprises at least one of a number of poles that are part of the unknown motor, rotor saliency, speed sensor teeth, phase sequence, speed sensor sequence, resistance value, inductance value, magnetization, frequency, torque, voltage, current, and resistance temperature.

3. The method of claim 1 further comprises applying torque to the unknown motor while measuring the characteristic value.

4. The method of claim 3 further comprises determining magnetization characteristics of the unknown motor.

5. The method of claim 3 further comprising:
   a. limiting an amount of torque produced;
   b. applying a voltage to the unknown motor to a known level based on a present vehicle speed;
   c. measuring an exciting current of the unknown motor;
   d. comparing the measured exciting current to expected levels; and
   e. if the determined motor type is different than that presently assumed, revising application parameters for optimum motor control.

6. The method of claim 5 wherein comparing the measured exciting current to expected levels comprises at least one of levels based on applied voltage, speed, and torque.

7. The method of claim 1 further comprises measuring the characteristic value while the unknown motor is not operating.

8. The method of claim 7 further comprises applying an external characteristic while measuring the characteristic value.

9. The method of claim 1 wherein measuring a characteristic value further comprises determining at least one of a current value and a torque value of the unknown motor so as to determine a number of poles.

10. The method of claim 1 wherein measuring a characteristic value further comprises measuring at least one of ripple current and voltage when a rotor on the unknown motor is spinning.

11. The method of claim 1 wherein measuring a characteristic value further comprises evaluating teeth on a speed sensor that is proximate the unknown motor.

12. The method of claim 1 wherein measuring a characteristic value further comprises measuring a phase sequence of the unknown motor.

13. The method of claim 1 wherein measuring a characteristic value further comprises measuring magnetization characteristics of the unknown motor.

14. The method of claim 1 wherein measuring a characteristic value further comprises measuring at least one of a resistance and inductance of the unknown motor while the unknown motor is not operating.

15. The method of claim 1 further comprising operating the unknown motor at a specific speed while measuring the characteristic value and comparing the measured characteristic value to a known characteristic value wherein the known characteristic value is based on the specific speed.

16. The method of claim 1 further comprises applying a known voltage for a short duration and measuring the unknown motor's phase current response; and comparing a resulting change in current over the short duration based on a change in phase current along with the known voltage and the short duration with an expected value.

17. The method of claim 16 further comprises applying at least one of a single-phase voltage and a high frequency three phase voltage such that the type of the unknown motor may be determined based on a resistance value of the unknown motor.

18. The method of claim 1 wherein the step of comparing the measured characteristic value to a known characteristic value further includes determining the known characteristic based on at least one of a look-up table and an equation into which the measured characteristic value is applied.

19. The method of claim 1 wherein the unknown motor is part of at least one of a locomotive and an off-road vehicle.

20. The method of claim 1 wherein the unknown motor comprises at least one of a traction motor, radiator motor, cooling blower motor, exhaust motor, alternator, and pump motor.

21. A system for autonomously identifying a type of an unknown motor, said unknown motor being configured to function optimally at a respective one of a plurality of known characteristic values, the system comprising:
   a. a measuring device to measure a characteristic value of the unknown motor;
   b. a processor that receives data specific to the measured characteristic value;
   c. a storage device in communication with the processor;
   d. wherein the processor compares the measured characteristic value to the plurality of known characteristic values, each known characteristic value being associated with a respective type of the unknown motor, so as to determine the type of the unknown motor.

22. The system of claim 21 further comprises an introducing device to provide an external characteristic to the unknown motor so that the measuring device can measure the characteristic value generated by the introduced element.

23. The system of claim 21 wherein the external characteristic comprises at least one of current and voltage.

24. The system of claim 21 wherein the known characteristic value is determined by at least one of a look-up table and an equation.

25. The system of claim 21 wherein the unknown motor is part of at least one of a locomotive and an off-road vehicle.

26. The system of claim 21 wherein the unknown motor comprises at least one of a traction motor, radiator motor, cooling blower motor, exhaust motor, alternator, and pump motor.

27. A computer software code operable within a processor for autonomously identifying a type of an unknown motor, said unknown motor being configured to function optimally at a respective one of a plurality of known characteristic values, the computer software code comprising:
   a. a computer module for measuring a characteristic value of the unknown motor;
   b. a computer module for comparing the measured characteristic value to the plurality of known characteristic values, each known characteristic value being associated with a respective type of the unknown motor, to ascertain the type of the unknown motor; and
   c. a computer module for identifying the type of the unknown motor based on the measured characteristic value when compared to the plurality of known characteristic values.

28. The computer software code of claim 27 further comprises a computer module for operating the unknown motor while measuring the characteristic value.

29. The computer software code of claim 27 further comprises a computer module for measuring the characteristic value while the unknown motor is not operating.

30. The computer software code of claim 27 further comprises a computer module for applying an external characteristic while measuring the characteristic value.

31. The computer software code of claim 27 wherein the unknown motor is part of at least one of a locomotive and an off-road vehicle.

32. The computer software code of claim 27 wherein the unknown motor comprises at least one of a traction motor, radiator motor, cooling blower motor, exhaust motor, alternator, and pump motor.

* * * * *